United States Patent
Wang et al.

(10) Patent No.: US 9,651,444 B2
(45) Date of Patent: May 16, 2017

(54) METHOD OF CUMULATIVE HELIUM MASS SPECTROMETRIC COMBINATION TEST BY USING ARGON AS GROSS-LEAK TRACER GAS

(71) Applicants: Genglin Wang, Beijing (CN); Ningbo Li, Beijing (CN); Fei Li, Beijing (CN)

(72) Inventors: Genglin Wang, Beijing (CN); Ningbo Li, Beijing (CN); Fei Li, Beijing (CN)

(*) Notice: Subject to any disclaimer, the term of this patent is extended or adjusted under 35 U.S.C. 154(b) by 474 days.

(21) Appl. No.: 14/134,006

(22) Filed: Dec. 19, 2013

(65) Prior Publication Data

US 2015/0073726 A1 Mar. 12, 2015

(30) Foreign Application Priority Data

Sep. 6, 2013 (CN) .......................... 2013 1 0404443

(51) Int. Cl.
  *G01N 31/00* (2006.01)
  *G01M 3/00* (2006.01)
  *G01M 3/20* (2006.01)

(52) U.S. Cl.
  CPC .............. *G01M 3/00* (2013.01); *G01M 3/202* (2013.01)

(58) Field of Classification Search
  CPC ......... H01L 2924/0002; H01L 2924/00; H01L 23/36; H01L 23/373; H01L 23/4275;
  (Continued)

(56) References Cited

U.S. PATENT DOCUMENTS

2014/0222353 A1* 8/2014 Wang ..................... G01M 3/229
  702/51

OTHER PUBLICATIONS

N. Hilleret, Leak Detection, 1999, pp. 203-212.*
United States Department of Defense, "Test Method Standard Microcircuits", MIL-STD-883J, Test 1014.14 (Sep. 26, 2012).

* cited by examiner

*Primary Examiner* — Roy Y Yi
(74) *Attorney, Agent, or Firm* — Pearl Cohen Zedek Latzer Baratz LLP

(57) ABSTRACT

The present invention discloses a method of cumulative helium mass spectrometric combination test by using argon gas as gross-leak tracer gas, and specifically gives the procedure for this gross-leak and fine-leak combination test, comprising steps and methods of selecting helium-argon prefilling method or helium-argon pressuring method, fixed or flexible scheme and the criterion $R_{Ar0max}$ for argon measured leak rate of gross-leak test according to the rigour grade $T_{Hemin}$, cavity volume, leak rate of surficially absorbed helium and argon and the history of the test of a component under test; designing time for pressuring of helium-argon pressuring method, the maximum test-waiting time of fine-leak test and the criterion for helium measured leak rate, helium-argon prefilling and helium-argon pressuring, removing absorbed helium and argon gas, gross-leak test, fine-leak test and complementally testing bigger gross leak, which enhances the sensitivity of gross-leak test, lengthens the maximum test-waiting time of fine-leak test, tremendously expands the range of adapted cavity volume and criterion for measured leak rate of fine-leak test, thus making the cumulative helium mass spectrometric combination test more applicable, convenient and practical.

6 Claims, 1 Drawing Sheet

(58) Field of Classification Search
CPC ......... H01L 23/3733; H01L 2924/3011; H01L 21/68792; C04B 2237/368; C04B 2237/64; C04B 2237/708; C04B 2237/72; C04B 2237/80; C04B 2237/84; C04B 35/645; C04B 37/006
See application file for complete search history.

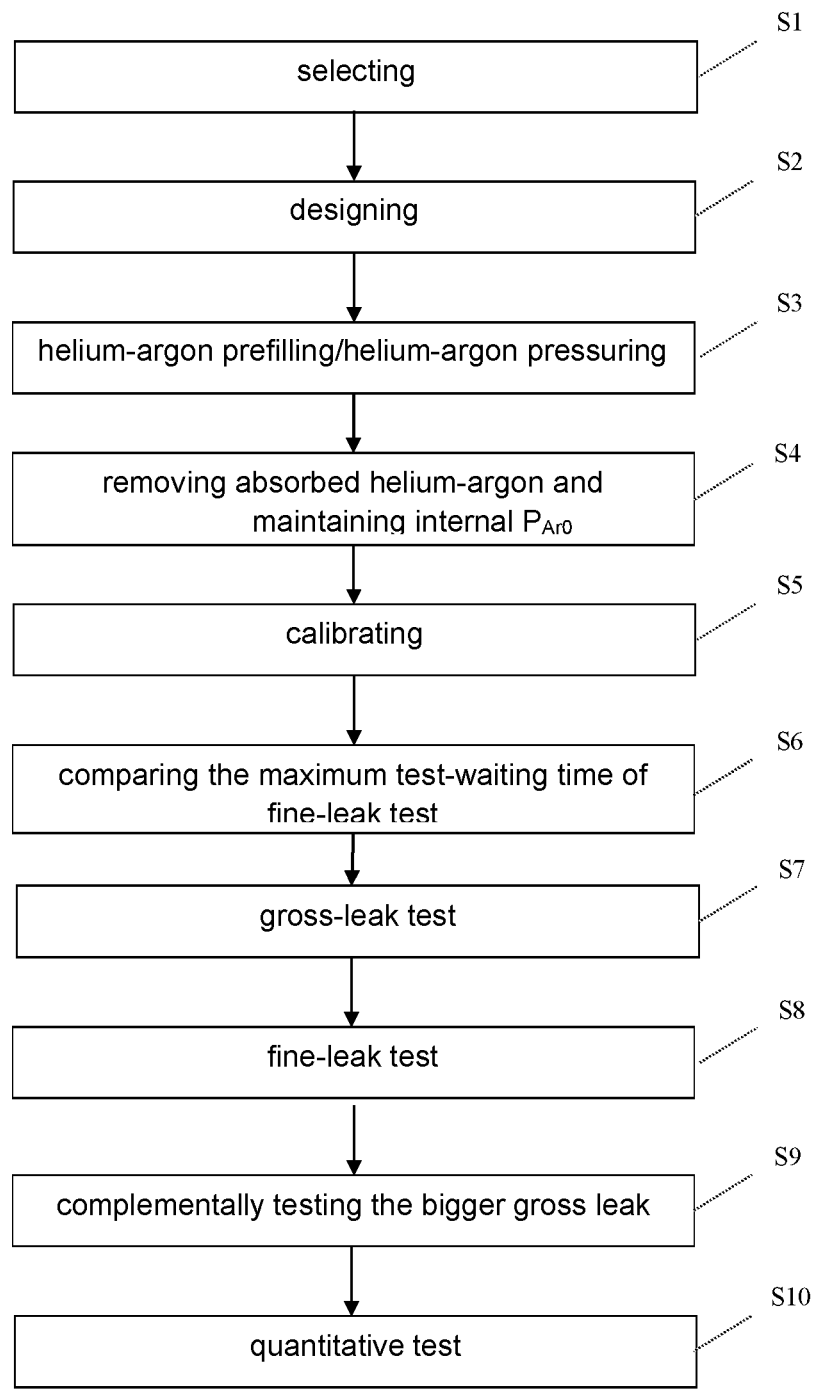

METHOD OF CUMULATIVE HELIUM MASS SPECTROMETRIC COMBINATION TEST BY USING ARGON AS GROSS-LEAK TRACER GAS

CROSS REFERENCE TO RELATED APPLICATION

This application claims priority from Chinese Patent Application No. 201310404443.2, filed on Sep. 6, 2013, which is hereby incorporated by reference in its entirety.

FIELD OF THE INVENTION

The present invention relates to the field of helium mass spectrometric fine-leak test of the sealability of a sealed electronic component, and in particular, to a method of cumulative helium mass spectrometric combination test by using argon as gross-leak tracer gas.

BACKGROUND OF THE INVENTION

So far, as the appearance of cumulative helium mass spectrometric combination leak detector (CHLD) employing the cryogenic pump technique with its test efficiency acceptable for requirements of the test on the sealability of electronic components, in many standards the test on a high rigour grade and a low equivalent standard leak rate L, employs the method of cumulative helium mass spectrometric gross-leak and fine-leak combination test. Current methods for cumulative helium mass spectrometric combination test all uses helium gas as tracer gas for gross-leak test, generally uses helium gas as tracer gas for fine-leak test, or may use various gas like argon gas, nitrogen gas, carbon dioxide, fluorocarbon compounds as tracer gas for fine-leak test. The sensitivity is higher when using helium gas as tracer gas for fine-leak test.

To control the helium leak rate background of the leak detector having test chamber, particularly to remove the leak rate of surficially absorbed helium of the component under test after helium pressurizing or helium prefilling so as to meet the requirements of being no larger than ⅕ or ⅓ of the criterion for helium measured leak rate of fine-leak test, a longer maximum test-waiting time after helium pressurizing or helium prefilling is needed. To quantitatively extend this maximum test-waiting time, the criterion for helium measured leak rate of gross-leak test should be correctly specified. Since the gross-leak test uses helium gas in the air as tracer gas, however the partial pressure of helium gas in air $P_{He0}$ is as low as 0.533 Pa, when the minimum detectable equivalent standard leak rate of gross-leak test $L_0$ takes the value of 1 Pa·cm$^3$/s as fluorocarbon-bubble method, the criterion for helium measured leak rate of gross-leak test $R_{0max}=1.42\times10^{-5}$ Pa·cm$^3$/s and the criterion for measured leak rate of fine-leak test $R_{max}$ must be less than $R_{0max}$, which in some degree limits the range of cavity volume and the criterion for measure leak rate of fine-leak test adapted for cumulative helium mass spectrometric combination test. If increasing $L_0$ and $R_{0max}$, although in some degree the range of cavity volume and measured leak rate adapted for fine-leak test in combination test is expanded, the maximum test-waiting time determined by $L_0$ gets shorter, and therefore the time for removing surficially absorbed helium of the component under test gets shorter. In a larger cavity volume range, the removal of the absorbed leak rate cannot meet the test requirement of the criterion for measured leak rate of fine-leak test. Accordingly for the current cumulative helium mass spectrometric combination test, there forms a unbreakable dilemma between making a stricter criterion for measured leak rate of fine-leak test as well as expanding the cavity volume range adapted for combination test, and extending maximum test-waiting time as well as removing absorbed helium of the component under test.

Based on the above description, it is necessary to seek for a test method to make gross-leak and fine-leak combination test using the cumulative helium mass spectrometric leak detector more practicable and to lengthens maximum test-waiting time of fine-leak test on a precondition of making a stricter criterion for measured leak rate of fine-leak test, which makes the removal of the leak rate of absorbed helium meet the test requirements of a stricter criterion and expends the adapted range of cavity volume and criterion for measured leak rate of fine-leak test.

Since the partial pressure of argon gas in the air is 946 Pa, much larger than the partial pressure of helium gas $P_{He0}$, when internal helium gas and argon gas are equivalent to the air, the leak rate of argon gas is 562 times as that of helium gas for the same gross-leak aperture, so that the sensitivity of using argon gas as tracer gas of gross-leak test is higher and in a dry environment the leak rate of surficially absorbed argon of the component under test can meet the test requirements of a lower $L_0$. Accordingly it is able to select a lower minimum detectable equivalent standard leak rate $L_0$ for gross-leak test, thereby extending the maximum test-waiting time of fine-leak test, which can remove absorbed argon and helium gas more sufficiently and meet the test condition requirements of criterions for gross-leak and fine-leak test. Using argon gas as gross-leak tracer gas, the values of helium measured leak rate of fine-leak test of the component under test after gross-leak test can effectively indicate the sizes of fine-leak, which is unnecessary to be limited by that the criterion $R_{max}$ for measured leak rate for fine leak must be smaller than the criterion $R_{0max}$ for measured leak rate for gross-leak as using helium gas as tracer gas, and able to effectively expand the range of cavity volume and criterion for measured leak rate for fine leak adapted for combination test, thus allowing cumulative helium mass spectrometric combination test to have more practicability and applicability.

SUMMARY OF THE INVENTION

It is an object of the invention to provide a method of cumulative helium mass spectrometric gross-leak and fine-leak combination test on sealability of components by using argon gas as gross-leak tracer gas and helium gas as fine-leak tracer gas, in which on a precondition of making a stricter criterion for measured leak rate of fine-leak test, the minimum detectable equivalent standard leak rate $L_0$ is lowered and the maximum test-waiting time of fine-leak test is lengthened, thereby making the removal of the leak rate of absorbed helium of the component under test can meet the test requirements of a stricter criterion and tremendously expand the range of cavity volume and criterion for measured leak rate of fine-leak test adapted for combination test.

To realize the above objects, the invention employs the following technical solutions.

A method of cumulative helium mass spectrometric combination test by using argon gas as gross-leak tracer gas, including primary sealability test and secondary sealability test comprising the following steps: Step S1 of selecting. The helium-argon prefilling method is selected for a primary sealability test and the helium-argon pressuring method for a secondary sealability test. The said helium-argon prefilling method employs a fixed scheme or a flexible scheme. For the helium-argon prefilling method employed for the primary sealability test, when the rigour grade $T_{Hemin}$ (2000d, 200d and 20d), cavity volume, the required removal of absorbed helium and absorbed argon, and the accuracy of test specified are applicable, the fixed scheme is selected. When the regulations of the fixed scheme are not completely applicable, the flexible scheme is selected. Additionally according to the cavity volume of the component under test, the leak rate of surficially absorbed argon of the component under test when being stored in dry air and argon leak rate background of the leak detector having test chamber, the criterion $R_{Ar0max}$ for argon measured leak rate of gross-leak test is selected.

For the fixed scheme of helium-argon prefilling method, on a precondition that $R_{Ar0max}$ is larger than the leak rate of surficially absorbed argon of the component under test in dry air by 3 times, corresponding to different cavity volumes, the minimum detectable equivalent standard leak rate of gross-leak test $L_0$ is respectively selected as 0.1 Pa·cm³/s, 0.3 Pa·cm³/s and 1.0 Pa·cm³/s, and $R_{Ar0max}$ as $7.95 \times 10^{-4}$ Pa·cm³/s, $2.39 \times 10^{-3}$ Pa·cm³/s and $7.95 \times 10^{-3}$ Pa·cm³/s. For the flexible scheme of helium-argon prefilling method and the helium-argon pressuring method, $R_{Ar0max}$ can be flexibly selected depending on the leak rate of absorbed argon of the component under test in dry air.

Further, in the Step S2 of designing. Aiming at the method, scheme and $R_{Ar0max}$ selected in S1, time for helium-argon pressuring $t_{1,n}$, maximum test-waiting time of fine-leak test $t_{max}$ and criterion for measured leak rate $R_{max}$ are designed and specified. The procedure and method of designing are as follows:

For helium-argon prefilling method, $t_{max}$ is $t_{3max}$, $R_{max}$ is $R_{2max}$. For helium-argon pressuring method, after n (n≥1) times of helium-argon pressuring, $t_{max}$ is $t_{3n.max}$, $R_{max}$ is $R_{2n.max}$.

Take the gross-leak argon gas exchange time constant:

$$\tau_{He0} = \frac{VP_{Ar0}}{R_{Ar0max}} \sqrt{\frac{M_{He}}{M_{Ar}}} \quad (1)$$

Where, V denotes a cavity volume of a component under test, $P_{Ar0}$ denotes the partial pressure of argon gas in normal air, $P_{Ar0}$=946 Pa, $M_{He}$ and $M_{Ar}$ respectively denote the molecular weight of helium gas and argon gas in grams, $M_{He}$=4.003 g, $M_{Ar}$=39.948 g.

Take the gross-leak helium gas exchange time constant:

$$\tau_{Ar0} = \frac{VP_{Ar0}}{R_{Ar0max}} \quad (2)$$

For helium-argon prefilling method, the maximum test-waiting time of fine-leak test $t_{3max}$ is obtained by formula (3.1):

If $T_{Hemin} > T_{He0}$ $$t_{3max} = \frac{\tau_{Hemin}\tau_{He0}}{\tau_{Hemin} - \tau_{He0}} \ln\left(\frac{\tau_{Hemin}}{\tau_{He0}}\right) \quad (3.1)$$

Where, the rigour grade $T_{Hemin}$ is the minimum helium gas exchange time constant of the component with acceptable sealability.

For the fixed scheme of the helium-argon prefilling method, $T_{Hemin}$ takes 2000d, 200d and 20d, and $t_{3max}$ conforms to formula (3.2).

$$t_{3max} \leq \frac{1}{10}\tau_{Hemin} \quad (3.2)$$

For the flexible scheme of the helium-argon prefilling method, $T_{Hemin}$ can flexibly take a value greater than $T_{He0}$.

For the fixed scheme of the helium-argon prefilling method, in a condition of test-waiting time $t_3 \leq t_{3max}$, the criterion for acceptable helium measured leak rate of fine-leak test $R_{2max}$ is obtained by formula (4)

$$R_{2max} = \frac{V_1 k P_0}{\tau_{Hemin}} \quad (4)$$

Where, $V_1$ denotes the minimum volume in a cavity volume segment. k denotes a ratio of the partial pressure of helium gas in the prefilled argon gas and helium gas to $P_0$, namely a ration of prefilled helium, $P_0$ denotes standard atmospheric Pressure, $P_0 = 1.013 \times 10^5$ Pa. For the fixed scheme of helium-argon prefilling method, take k=21.0% to allowing for unforeseen circumstances.

The equivalent standard leak rate of a cavity volume segment of the fixed scheme of the helium-argon prefilling method is obtained according to $R_{2max}$ by formula (5):

$$L_{2max} = \frac{1}{k} R_{2max} \sqrt{\frac{M_{He}}{M_A}} \quad (5)$$

Where, $M_A$ denotes the mean molecular weight of air in grams, $M_A$=28.96 g.

For the flexible scheme of helium-argon prefilling method, $R_{2max}$ is obtained by formula (6):

$$R_{2max} = \frac{VkP_0}{\tau_{Hemin}} \exp\left(-\frac{t_3}{\tau_{Hemin}}\right) \quad (6)$$

Where, k denotes a ratio of prefilled helium of flexible scheme, and preferably takes k=21.0% or can take a value in the range of 3%~50%. $t_3$ denotes an actual test-waiting time but should be no longer than $t_{3max}$ specified in formula (3.1).

For helium-argon pressuring method, for n (n≥1) times of the helium and argon pressuring, the partial pressure of helium is $P_{E.n}$. Time for the nth helium-argon pressuring is obtained by formula (7).

$$\left.\begin{array}{l} t_{1,n} \geq \frac{1}{e} \frac{1}{P_{E.n}} \left(\frac{1}{10} k P_0 t_{3.0n} + \frac{1}{3} \sum_{i=1}^{n-1} P_{E.i} t_{1.i}\right) \\ t_{1,n} \geq 1.2h \end{array}\right\} \quad (7)$$

Where, $P_{E.i}$ and $t_{1.i}$ respectively denote the partial pressure of helium gas and time for helium and argon pressuring for the ith helium-argon pressuring each. $t_{3.0n}$ is an interval time from the ending of helium-argon prefilling and sealing to the ending of the nth helium and argon pressuring.

When the time for nth helium and argon pressuring of helium-argon pressuring method meets formula (7), the maximum test-waiting time $t_{3n.max}$ of fine-leak test after nth helium-argon pressuring is approximately obtained by formula (8)

When $T_{Hemin} > T_{He0}$ $$t_{3n.max} = \frac{\tau_{Hemin}\tau_{He0}}{\tau_{Hemin} - \tau_{He0}} \ln\left(\frac{\tau_{Hemin}}{\tau_{He0}}\right)$$
$$t_{3n.max} \leq \frac{1}{10}\tau_{Hemin}$$
(8)

After the nth helium-argon pressuring, the criterion for acceptable helium measured leak rate of fine-leak test $R_{2n.max}$ is obtained by formula (9):

$$R_{2n.max} = \frac{V}{\tau_{Hemin}} \exp\left(-\frac{t_{3n}}{\tau_{Hemin}}\right)$$
$$\left\{kP_0 \exp\left(-\frac{t_{3.0n}}{\tau_{Hemin}}\right) + \sum_{i=1}^{n} P_{E,i}\left[1 - \exp\left(-\frac{t_{1,i}}{\tau_{Hemin}}\right)\right] \exp\left(-\frac{t_{3.in}}{\tau_{Hemin}}\right)\right\}$$
(9)

Where, $t_{3n}$ is a test-waiting time after the nth helium-argon pressuring and $t_{3n}$ should not be longer than $t_{3n.max}$ specified in formula (8). $t_{3.in}$ is an interval time from the ending of the ith helium-argon pressuring to the ending of the nth helium-argon pressuring.

For the flexible scheme of helium-argon prefilling method and helium-argon pressuring method, an equivalent standard leak rate corresponding to the criterion for measured leak rate of fine-leak test is obtained by formula (10).

$$L_{max} = \frac{VP_0}{\tau_{Hemin}} \sqrt{\frac{M_{He}}{M_A}}$$
(10)

Further, in the Step S3 of helium-argon prefilling or helium-argon pressuring, for helium-argon prefilling method, the total pressure of the prefilled gas should be $1.05 \sim 1.10 P_0$, wherein the ratio of the partial pressure of argon gas to the total pressure is 0.934%. The ratio of partial pressure of helium gas to the total pressure is 21.0% for a fixed scheme, preferably this ratio for a flexible scheme is 21.0% or varies in 3%~50%, and the rest is the nitrogen gas. For the helium-argon pressuring method, in the nth helium-argon pressuring, the partial pressure of argon gas in the pressured gas is 946 Pa, the partial pressure of helium gas is $P_{E,n}$ and the time $t_{1,n}$ for helium-argon pressuring should conform to formula (7).

Further, in the Step S4 of removing absorbed helium-argon and maintaining internal $P_{Ar0}$, the removal of the absorption should be carried out in an ambient having normal partial pressure of argon gas in air. Time for removing should not exceed the maximum test-waiting time of fine-leak test $t_{max}$ and generally be no longer than ½ of $t_{2max}$; After removing the absorption, the leak rate $R_a$ of absorbed helium of a leakless sample from the components under test should be no more than ⅓ of the criterion for helium measured leak rate $R_{max}$ of fine-leak test, the leak rate $R_{Ara}$ of absorbed argon of a leakless sample should be no more than ⅓ of the criterion for argon measured leak rate $R_{Ar0max}$ of gross-leak test.

Further, in the Step S4 of removing absorbed helium-argon and maintaining internal $P_{Ar0}$, after helium-argon prefilling and sealing or helium-argon pressuring of a component under test, its internal partial pressure of argon gas $P_{Ar0}$ should be maintained. If placed in vacuum (including vacuum test) or in gas lacking the normal partial pressure of argon gas in the air for a time of $t_4$, the component under test must be placed in the normal air for a period no less than $3t_4$ or $3T_{Ar0}$ (take the smaller value between them) before conventionally carried out argon gross-leak test in combination test; or it must be placed in air for a period no less than $2.2t_4$ or $2.2T_{Ar0}$. The criterion for argon measured leak rate for gross leak takes the value of 90% of $R_{Ar0max}$.

Further, in the Step S7 of gross-leak test, before the gross-leak test using argon gas as tracer gas in the combination test of a component under test, the time for starting taking value of gross-leak test $t_{Ar0min}$ and the maximum test time $t_{Ar0max}$ should be specified. According to the selection of $R_{Ar0max}$, corresponding cumulative helium mass spectrometric leak detector and test chamber are selected, wherein $t_{Ar0min}$ is the maximum time since beginning gross-leak test as vacuuming the detecting chamber to argon background leak rate falling to the value which is no more than (⅓) $R_{Ar0max}$ when the system is stable and no component under test is placed in the test chamber. The maximum test time $t_{Ar0max}$ of gross-leak test should be far shorter than $T_{Ar0}$ of a component under test. Generally $t_{Ar0max}$ takes the value no longer than (1/100) $T_{Ar0}$, and it can be $(1.5 \sim 2)t_{Ar0min}$. The argon measured leak rate of gross-leak test $R_{Ar0}$ is read between $t_{Ar0min}$ and $t_{Ar0max}$. In gross-leak test, argon measured leak rate can be detected either by cumulating the leakage of argon gas or not, but the test gas pipes should not be connected to the cryogenic pump. If $R_{Ar0} \geq R_{Ar0max}$, the gross-leak test of the component under test is judged as failed; if $R_{Ar} < R_{Ar0max}$, the gross-leak test is judged as acceptable, and Step S8 of fine-leak test is proceeded.

The invention is advantageous by providing the applying procedure and further effectively lengthening the maximum test-waiting time of fine-leak test via putting forward the method of cumulative helium mass spectrometric combination test by using argon as tracer gas of gross-leak test and using helium gas as tracer gas of fine-leak test, which may guarantee the removal of absorbed argon of a component under test meeting the test requirements of a high rigour grade and a low criterion for fine leak of measured leak rate, thus tremendously expanding the range of the cavity volume and criterion for helium gas measured leak rate of fine-leak test adapted for combination test. In the range of cavity volume of $0.0006$ $cm^3 \sim 200$ $cm^3$, the helium pressuring method and particularly helium prefilling method of the method of cumulative helium mass spectrometric combination test by using helium gas as tracer gas of gross-leak test and fine-leak test are adapted for partial range of cavity volume only for a rigour grade $T_{Hemin}$ of 2000d, 200d or higher. However, the method of cumulative helium mass spectrometric combination test by using argon gas as gross-leak tracer gas and helium gas as fine-leak tracer gas is not only adapted for the total range of cavity volume for a rigour grade $T_{Hemin}$ of 2000d and 200d, but also adapted for most of the range of the cavity volume and for a lower rigour grade $T_{Hemin}$ of 20d. The adapted range of the criterion for measured leak rate of fine-leak test of combination test using helium gas as gross-leak tracer gas generally is from 5 times of the minimum background of the detector (for example $2 \times 10^{-8}$ Pa·cm$^3$/s) to a value less than $1.42 \times 10^{-5}$ Pa·cm$^3$/s (it can be less than $1.42 \times 10^{-4}$ Pa·cm$^3$/s for the larger range of cavity volume). The fixed scheme of helium-argon prefilling method of this method for combination test with an adapted range of the criterion for measured leak rate of fine-leak test, which is from 2.46×10⁻² Pa·cm³/s to 7.39×10⁻⁸ Pa·cm³/s, can be used to detect a fine leak of a larger range of $T_{Hemin}$ and $L_{max}$, thus making this method for combination test is more adapted, convenient and applicable than method of cumulative helium mass spectrometric combination test by using helium gas as tracer gas of gross-leak and fine-leak test. Employing the present invention can both realize the improvement of related methods and standards and contribute to improve the construction and test procedure of the cumulative helium mass spectrometric leak detector.

DETAILED DESCRIPTION OF THE EMBODIMENTS

1, The Related Terms, Symbols and Definitions

The equivalent standard leak rate L refers to a flow rate of air with a temperature of 25° C.±5° C. and a dew point lower than −25° C. that passes through a leak aperture according to a molecular flow model provided that air is composed of molecules of a single type, where the pressure at an entrance of the leak aperture is 101.3 kPa and the pressure at an exit of the leak aperture is lower than 1 kPa. The equivalent standard leak rate is a virtual equivalent, and also referred to as an air standard leak rate.

The helium standard leak rate $L_{He}$ refers to a flow rate of helium gas with a temperature of 25° C.±5° C. that passes through a leak aperture according to a molecular flow model, where the pressure of the helium gas at an entrance of the leak aperture is standard atmospheric pressure $P_0$, i.e., 101.3 kPa, and the pressure of the helium gas at an exit of the leak aperture is lower than 1 kPa. The standard leak rate of any gas is inversely proportional to the square root of a molecular weight of the gas in grams as follows:

$$L_{He} = \sqrt{\frac{M_A}{M_{He}}} L$$

Where, $M_A$ denotes the mean molecular weight of air in grams, and $M_{He}$ denotes the molecular weight of helium gas in grams.

The fine-leak test refers to sealability test on a sealed component with an equivalent standard leak rate L no larger than 0.1 Pa·cm³/s~1.0 Pa·cm³/s.

The gross-leak test refers to sealability test on a sealed component with an equivalent standard leak rate L no less than 0.1 Pa·cm³/s~1.0 Pa·cm³/s, i.e., a measured leak rate $R_{Ar0}$ of gross-leak test using argon gas as tracer gas no less than 7.95×10⁻⁴ Pa·cm³/s~7.95×10⁻³ Pa·cm³/s.

The minimum detectable leak rate $L_0$ of gross-leak test refers to the minimum equivalent standard leak rate that may be detected for the specified criterion $R_{Ar0max}$ for gross-leak argon measured leak rate, Helium gas exchange time constant $T_{He}$ refers to the time needed when the internal helium gas pressure of a vacuum sealed component in a helium gas environment reaches (1−1/e), i.e., 63.2%, of the environmental helium gas pressure.

$$\tau_{He} = \frac{VP_0}{L_{He}} = \frac{VP_0}{L}\sqrt{\frac{M_{He}}{M_A}}$$

Where, V denotes a cavity volume of a sealed component.

Helium gas exchange time constant $T_{He0}$ for gross leak refers to the helium gas exchange time constant corresponding to the minimum detectable leak rate $L_0$ of gross-leak test.

$$\tau_{He0} = \frac{VP_0}{L_0}\sqrt{\frac{M_{He}}{M_A}}$$

Argon gas exchange time constant $T_{Ar0}$ for gross leak refers to the argon gas exchange time constant corresponding to the minimum detectable leak rate $L_0$ of gross-leak test.

$$\tau_{Ar0} = \frac{VP_0}{L_0}\sqrt{\frac{M_{Ar}}{M_A}} = \frac{VP_{Ar0}}{R_{Ar0max}}$$

Where, $P_{Ar0}$ denotes the partial pressure of argon gas in the atmospheric environment, $P_{Ar0}$=946 Pa; $M_{Ar}$ denotes the molar mass of argon gas in grams; $R_{Ar0max}$ denotes a criterion for argon gas measured leak rate of gross-leak test.

A rigour grade $T_{Hemin}$ refers to a constant of the allowable minimum helium gas exchange time for an acceptable component under test.

The helium-argon prefilling method refers to the method of internally prefilling nitrogen gas having specified ratios of helium gas and argon gas into a component under first leak test, and carrying out cumulative helium mass spectrometric combination test using argon gas as tracer gas for gross leak and helium gas as tracer gas for fine leak after sealing.

Helium-argon pressuring method refers to the method of secondary leak test of the component internally prefilled with helium gas and argon gas, pressuring helium gas and argon gas having specified pressure, then carrying out cumulative helium mass spectrometric combination test using argon gas as tracer gas for gross leak and helium gas as tracer gas for fine leak.

The fixed scheme of helium-argon prefilling method is such a test scheme that a fixed ratio of prefilled helium and argon, the maximum test waiting time and the criterion for helium gas measured leak rate are specified for the selected rigour grade, cavity volume segment and the criterion for argon gas measured leak rate of gross-leak test. The fixed scheme is convenient and easy to operate but is accompanied with a certain test deviation.

The flexible scheme of helium-argon prefilling method is such a test that a fixed ratio of prefilled argon is specified and a ratio of prefilled helium, the maximum test-waiting time for fine leak and the criterion for measured leak rate are flexibly specified for a given cavity volume, a rigour grade and the criterion for argon measured leak rate for gross leak flexibly selected. The flexible scheme of helium-argon pressuring method is such a test that a fixed partial pressure of argon gas in the pressuring gas is specified and a partial pressure of helium gas in the pressuring gas, time for helium-argon pressuring, the maximum test-waiting time and the criterion for measured leak rate for fine leak are flexibly specified for a given cavity volume, a rigour grade and the criterion for argon measured leak rate for gross leak flexible selected. The flexible scheme can be used for more accurate test, but involves flexible and specific design and calculation of the test condition and the criterion for measured leak rate.

2. Instruments, Tool Sets and the Component Under Test

The needed test instruments and tool sets for the method of cumulative helium mass spectrometric combination test by using argon gas as gross-leak tracer gas mainly include: a helium-argon prefilling and sealing device, a helium-argon pressuring tank, a detecting chamber, a standard aperture, a cumulative helium mass spectrometric combination leak detector, etc.

The helium-argon prefilling and sealing device should meet the following requirements that:
   the pressure of prefilled gas is 1.05~1.10 standard atmospheric pressure $P_0$;
   the device can be vacuumed to below 10 Pa;
   the device can be prefilled with a gas mixture of nitrogen, helium and argon, is wherein the ratio of the partial pressure of argon gas to the total pressure is 0.934%, the ratio of the partial pressure of helium gas to the total pressure is 21.0% or 3%~50% and the rest is nitrogen. The ratios of argon gas and helium gas are not deviated by more than ±5%; and
   the component is sealed in the prefilled gas.

The helium-argon pressurizing tank should meet the following requirements of:
   a sustainable internal pressure with an absolute pressure of the total pressure for helium-argon pressuring and a sustainable external pressure with an absolute pressure of the standard atmospheric pressure;
   the tank can be vacuumed to below 10 Pa;
   in the pressured gas, the partial pressure of argon gas $P_{Ar0}$=946 Pa and the partial pressure of helium gas is designed $P_{E,n}$. Neither $P_{E,n}$ nor $P_{Ar0}$ are deviated by more than ±5%; and
   a pressure drop in 40 hours less than 10% of the initial pressure inside the tank which is the highest pressure of helium pressuring.

The detecting chamber should meet the following requirements that:
   its effective capacity meeting the leak test requirements shall be as small as possible, and the net volume of the detecting chamber after putting into a component under test is no more than 50 times of the cavity volume V of the component under test.
   the chamber can be vacuumed to below 5 Pa after being closed; and
   a standard leak aperture should be able to be put into the chamber or be connected to the chamber in the shortest distance.

The standard leak aperture should meet the following requirements that:
   the measurable leak rate range that can be calibrated and covered by the nominal value of the leak rate of the helium and argon standard aperture should meet the argon gas gross-leak and helium gas fine-leak test requirements; and
   the standard leak aperture should be used in the calibration or verification validity period.

During cumulative helium mass spectrometric gross-leak and fine-leak combination test, the cumulative helium mass spectrometric combination leak detector should meet the corresponding standards and the requirements of the present test method. The helium mass spectrometric leak test system which is connected to the detecting chamber should meet the following requirements:
   a normal maintenance procedure should be carried out on the leak test system according to a maintenance regime. The detector should work in a clean indoor environment with a temperature of $25_{-5}^{+3\circ}$ C., a relative humidity no more than 50% and without an argon gas and helium gas contamination;
   having the function of using argon gas as tracer gas of gross-leak test, the gross-leak test can be carried out via cumulating the leakage of argon gas or not, but the test gas channel should not be connected to the cryogenic pump; Having the function of using helium gas as tracer gas of fine-leak test, the test gas of fine-leak test can be carried out by cumulating via the cryogenic pump or be carried out without the cryogenic pump and cumulating.
   the leak test system is started and working parameters of the leak detector are adjusted, so that the leak detector is warmed and works for a period of time, and a specified verification method is employed to verify that the leak test system is in a stable working state. In the stable working state, the stable background value of argon measured leak rate $R_{Arb}$ of the leak detector during the load-free test should be no larger than ⅓ of the criterion for argon measured leak rate $R_{Ar0max}$ of gross-leak test, and the stable background value of helium leak rate $R_b$ of fine-leak test should be no larger than ⅕ of the criterion for helium measured leak rate $R_{max}$ of fine-leak test;
   the system can provided with the relation curve between argon measured leak rate and time for gross-leak test started from flushing during gross-leak test and can determine whether to carry out the cumulative gross-leak test or not, the criterion for argon measured leak rate $R_{Ar0max}$, start time for taking value $t_{Ar0min}$ and the maximum time $t_{Ar0max}$ of gross-leak test;
   the system can provided with the relation curve between helium measured leak rate and time for fine-leak test during fine-leak test and can determine whether to carry out the cumulative fine-leak test or not, the criterion for helium measured leak rate $R_{max}$ and the start time for fine-leak test $t_5$;
   when needed, after stabilizing the system again, the leak test system shall be verified whether it is in a stable working state by employing a specified verification method (for example, one or several load-free tests), and then other component is then detected; and
   the vacuumed detecting chamber is filled with gas, preferably with a clean nitrogen gas, so as to alleviate the contamination of the helium gas and argon gas in the leak test system.

The component under test should meet the following requirements:
   the welding material structure and the surface conditions of the welding seam, the metal, the glass and the ceramic of the component under test should be controlled, and fingerprints, welding flux and organic materials on the surface thereof should be reduced or eliminated, to avoid excessive helium gas and argon gas absorbed on the surface during helium-argon prefilling, helium-argon pressurizing and storing;
   measures shall be taken to ensure that no unstable leak aperture or seam and sub-cavity outside a sealing nugget ring exist on the component under test;
   the mixed nitrogen, helium and argon gas filled and the argon and helium gas pressured when the component under test is sealed should be dry and clean; and
   after helium-argon prefilling and sealing or helium-argon pressuring, the component under test should be preserved in a dry and clean air environment with a normal helium and argon gas content, without being contaminated, to alleviate the contamination of the helium mass spectrometric leak test system and prevent a leak aperture from being blocked.

During the working process, the following safety regulations shall be followed:

the gas cylinders of the nitrogen gas, the helium gas and the argon gas should conform to the safety laws and standards;

the helium-argon pressurizing tank and the connection pipes must pass through a strength test in a condition of 1.5 times of the pressure of pressurized gas the pressure applied should not be higher than the sustainable pressure of a component under test; and the pressurizing and discharging rate of the helium-argon pressurizing tank is controlled, so that both the pressurizing time and the discharging time for reaching a test pressure should be no less than 20s.

3. Embodiments

The present invention provides a method of cumulative helium mass spectrometric combination test by using argon gas as gross-leak tracer gas and helium gas as fine-leak tracer gas. The working procedure thereof is as follows:

Step S1 of Selecting:

According to basic criterions, the rigour grade $T_{Hemin}$, cavity volume, absorbed argon and helium and its removal and the history of leak test, selecting helium-argon prefilling method or helium-argon pressuring method, fixed or flexible scheme and the criterion $R_{Ar0max}$ for argon measured leak rate of gross-leak test.

$T_{Hemin}$ is specified by the product specifications and the contract. When the sealability requirements of the product specifications or the contract is an equivalent standard criterion for leak rate $L_{max}$, $T_{Hemin}$ is obtained by formula (11):

$$\tau_{Hemin} = \frac{VP_0}{L_{max}} \sqrt{\frac{M_{He}}{M_A}} \quad (11)$$

Where, V denotes a cavity volume of a component under test; $P_0$ denotes a standard atmospheric pressure, $P_0=1.013\times 10^5$ Pa; $M_{He}$ denotes the molecular weight of helium gas in grams, $M_{He}=4.003$ g; $M_A$ denotes the mean molecular weight of air in grams, $M_A=28.96$ g.

The helium-argon prefilling method is selected for the first sealability test and the helium-argon pressuring method is selected for the secondary sealability test. For the helium-argon prefilling method, generally the fixed scheme which is easy to operate but is accompanied with a certain test deviation is selected; the flexible scheme which can be used for more accurate test, but involves flexible and specific design and calculation of the test condition and the criterion for measured leak rate may also be selected as well. For the helium-argon pressuring method, a flexible scheme is always employed.

According to the $T_{Hemin}$, the cavity volume, and the leak rate of surficially absorbed argon of a component under test, and the argon leak rate background of a detector with a test kit, the minimum detectable equivalent standard leak rate $L_0$ for gross leak and the corresponding criterion for argon measured leak rate $R_{Ar0max}$ are selected. For the fixed scheme of the helium-argon prefilling method, as shown in Table 1 and Table 2, according to the cavity volume V of a component under test, on a precondition that $R_{Ar0max}$ is larger than leak rate of surficially absorbed argon of the component under test in dry air by 3 times, $R_{Ar0max}$ is selected as $7.95\times10^{-4}$ Pa·cm$^3$/s, $2.39\times10^{-3}$ Pa·cm$^3$/s and $7.95\times10^{-3}$ Pa·cm$^3$/s; For the flexible scheme of helium-argon prefilling method and helium-argon pressuring method, depending on the leak rate of absorbed argon of the component under test in dry air, $R_{Ar0max}$ can be selected from the values above or selected flexibly.

Step S2 of Designing:

Aiming at the method, scheme and $R_{Ar0max}$ selected in S1, time for helium-argon pressuring $t_{1-n}$, maximum test-waiting time of fine-leak test $t_{max}$ and criterion for measured leak rate $R_{max}$ are designed and specified. The procedure and method of designing are as follows:

$T_{Hemin}$ in of the fixed scheme of the helium-argon prefilling method of the present invention is respectively 2000d, 200d or 20d (respectively called as space-level grade, sub-space-level grade and military grade). the range of the adapted cavity volume V is 0.0006 cm$^3$~200 cm$^3$, and is segmented to $\sqrt{10}$. But for each method and scheme, adapted $T_{Hemin}$ and V are both limited to $T_{Hemin}>T_{He0}$.

For helium-argon prefilling method, $t_{max}$ is $t_{3max}$, $R_{max}$ is $R_{2max}$. For helium-argon pressuring method, $t_{max}$ is $t_{3n.max}$, $R_{max}$ is $R_{2n.max}$.

Take the gross-leak argon gas exchange time constant:

$$\tau_{He0} = \frac{VP_{Ar0}}{R_{Ar0max}} \sqrt{\frac{M_{He}}{M_{Ar}}} \quad (1)$$

Where, $P_{Ar0}$ denotes the normal partial pressure of argon gas in air, $P_{Ar0}=946$ Pa; $M_{Ar}$ denotes the molecular weight of argon gas in grams, $M_{Ar}=39.948$ g.

Take the gross-leak helium gas exchange time constant:

$$\tau_{Ar0} = \frac{VP_{Ar0}}{R_{Ar0max}} \quad (2)$$

A cavity volume $V_{max}$ meeting the requirement $T_{Hemin}>T_{He0}$;

$$V_{max} = \frac{\tau_{Hemin} R_{Ar0max}}{P_{Ar0}} \sqrt{\frac{M_{Ar}}{M_{He}}} \quad (12)$$

For the helium-argon prefilling method, If $T_{Hemin}>T_{He0}$, namely if the cavity volume $V<V_{max}$, the maximum test-waiting time of fine-leak test $t_{3max}$ is obtained by formula (3.1):

$$t_{3max} = \frac{\tau_{Hemin}\tau_{He0}}{\tau_{Hemin} - \tau_{He0}} \ln\left(\frac{\tau_{Hemin}}{\tau_{He0}}\right) \quad (3.1)$$

Where, the rigour grade $T_{Hemin}$ is a minimum helium gas exchange time constant of the component with acceptable sealability; for a fixed scheme, $T_{He0}$ is a $T_{He0}$ of the minimum volume in a corresponding cavity volume segment.

For the fixed scheme of the helium-argon prefilling method, $t_{3max}$ should conform to formula (3.2).

$$t_{3max} \le \frac{1}{10}\tau_{Hemin} \quad (3.2)$$

For the flexible scheme of the helium-argon prefilling method, $T_{Hemin}$ can flexibly take any value greater than $T_{He0}$.

For the fixed scheme of the helium-argon prefilling method, in a condition of test-waiting time $t_3 \leq t_{3max}$, the criterion for acceptable helium measured leak rate of fine-leak test $R_{2max}$ is obtained by formula (4)

$$R_{2max} = \frac{V_1 k P_0}{\tau_{Hemin}} \quad (4)$$

Where, $V_1$ denotes the minimum volume in a cavity volume segment. k denotes a ratio of the partial pressure of helium gas in the prefilled argon gas and helium gas to $P_0$, namely a ration of prefilled helium, and takes k=21.0% to allowing for unforeseen circumstances.

The equivalent standard leak rate of a cavity volume segment of the fixed scheme of the helium-argon prefilling method can be obtained according to $R_{2max}$ via formula (5):

$$L_{2max} = \frac{1}{k} R_{2max} \sqrt{\frac{M_{He}}{M_A}} \quad (5)$$

A group of values of $t_{3max}$ for the fixed scheme of the helium-argon prefilling method obtained via formula (3.1), (3.2) and (12) is shown in Table 1; a group of values of $R_{2max}$ and $L_{2max}$ for the fixed scheme of the helium-argon prefilling method obtained via formula (4) and (5) is shown in Table 2. "—" in Table 1 and Table 2 denote a value limiting by $V_{max}$.

For the flexible scheme of helium-argon prefilling method, $R_{2max}$ is obtained via formula (6):

$$R_{2max} = \frac{V k P_0}{\tau_{Hemin}} \exp\left(-\frac{t_3}{\tau_{Hemin}}\right) \quad (6)$$

Where, k denotes a ratio of prefilled helium of flexible scheme, and preferably takes k=21.0% or can take a value in the range of 3%~50%. $t_3$ denotes an actual test-waiting time but should be no longer than $t_{3max}$ specified in formula (3.1); $T_{Hemin}$ can flexibly take any value more than $T_{He0}$.

TABLE 1

The maximum test-waiting time $t_{3max}$ of fine-leak test for the fixed scheme of the helium-argon prefilling method

| Cavity volume | Rigour grade $T_{Hemin}$ | | |
|---|---|---|---|
| V Segment ($cm^3$) | 20d | 200d | 2000d |
| | $t_{3max}$ (h) | | |
| | Criterion for measured leak rate of gross-leak test $R_{Ar0max} = 7.95 \times 10^{-4}$ Pa·$cm^3$/s ($L_0 = 0.1$ Pa·$cm^3$/s) | | |
| 0.0006~<0.002 | 0.561 | 0.706 | 0.850 |
| 0.002~<0.006 | 1.62 | 2.10 | 2.58 |
| 0.006~<0.02 | 4.17 | 5.61 | 7.06 |
| 0.02~<0.06 | 11.4 | 16.2 | 21.0 |
| 0.06~<0.2 | 27.6 | 41.7 | 56.1 |
| | Criterion for measured leak rate of gross-leak test $R_{Ar0max} = 2.39 \times 10^{-3}$ Pa·$cm^3$/s ($L_0 = 0.3$ Pa·$cm^3$/s) | | |
| 0.006~<0.02 | 1.62 | 2.10 | 2.58 |
| 0.02~<0.06 | 4.56 | 6.15 | 7.76 |
| 0.06~<0.2 | 11.4 | 16.2 | 21.0 |
| 0.2~<0.6 | 29.9 | 45.6 | 61.5 |
| 0.6~<2 | 48 | 114 | 162 |
| 2~<6 | 48 | 299 | 456 |
| | Criterion for measured leak rate of gross-leak test $R_{Ar0max} = 7.95 \times 10^{-3}$ Pa·$cm^3$/s ($L_0 = 1.0$ Pa·$cm^3$/s) | | |
| 0.2~<0.6 | 11.4 | 16.2 | 21.0 |
| 0.6~<2 | 27.6 | 41.7 | 56.1 |
| 2~<6 | 48 | 114 | 162 |
| 6~<20 | 48 | 276 | 417 |
| 20~<60 | 48 | 480 | 1142 |
| 60~<200 | — | 480 | 2759 |

TABLE 2 the criterion for measured leak rate $R_{2max}$ of fine-leak test for fixed scheme of helium-argon prefilling method and the corresponding criterion for equivalent standard leak rate $L_{max}$

| Cavity volume | Rigour graden $T_{Hemin}$ | | | | | |
|---|---|---|---|---|---|---|
| | 20 d | | 200 d | | 2000 d | |
| V Segment ($cm^3$) | $R_{2max}$ (Pa·$cm^3$/s) | $L_{2max}$ (Pa·$cm^3$/s) | $R_{2max}$ (Pa·$cm^3$/s) | $L_{2max}$ (Pa·$cm^3$/s) | $R_{2max}$ (Pa·$cm^3$/s) | $L_{2max}$ (Pa·$cm^3$/s) |
| 0.0006~<0.002 | 7.39E−6 | 1.31E−5 | 7.39E−7 | 1.31E−6 | 7.39E−8 | 1.31E−7 |
| 0.002~<0.006 | 2.46E−5 | 4.36E−5 | 2.46E−6 | 4.36E−6 | 2.46E−7 | 4.36E−7 |
| 0.006~<0.02 | 7.39E−5 | 1.31E−4 | 7.39E−6 | 1.31E−5 | 7.39E−7 | 1.31E−6 |
| 0.02~<0.06 | 2.46E−4 | 4.36E−4 | 2.46E−5 | 4.36E−5 | 2.46E−6 | 4.36E−6 |
| 0.06~<0.2 | 7.39E−4 | 1.31E−3 | 7.39E−5 | 1.31E−4 | 7.39E−6 | 1.31E−5 |
| 0.2~<0.6 | 2.46E−3 | 4.36E−3 | 2.46E−4 | 4.36E−4 | 2.46E−5 | 4.36E−5 |
| 0.6~<2 | 7.39E−3 | 1.31E−2 | 7.39E−4 | 1.31E−3 | 7.39E−5 | 1.31E−4 |
| 2~<6 | 2.46E−2 | 4.36E−2 | 2.46E−3 | 4.36E−3 | 2.46E−4 | 4.36E−4 |
| 6~<20 | 7.39E−2 | 1.31E−1 | 7.39E−3 | 1.31E−2 | 7.39E−4 | 1.31E−3 |
| 20~<60 | 2.46E−1 | 4.36E−1 | 2.46E−2 | 4.36E−2 | 2.46E−3 | 4.36E−3 |
| 60~<200 | — | — | 7.39E−2 | 1.31E−1 | 7.39E−3 | 1.31E−2 | for the nth (n≥1) helium and argon pressuring of the helium-argon pressuring method, the total pressure of the pressured gas is approximately $P_{E,n}$, which should be sustained by a sealed component and should be no more than $8P_0$ and generally no less than $2P_0$; but when the cavity volume $V \geq 1$ cm$^3$, it can be no less than $P_0$ for a sealed component with a thin cover.

Time for the nth helium-argon pressuring is obtained by formula (7).

$$t_{1,n} \geq \frac{1}{e} \frac{1}{P_{E,n}} \left( \frac{1}{10} k P_0 t_{3,0n} + \frac{1}{e} \sum_{i=1}^{n-1} P_{E,i} t_{1,i} \right) \quad (7)$$

$$t_{1,n} \geq 1.2h$$

Where, $P_{E,i}$ and $t_{1,i}$ respectively denote the partial pressure of helium gas and time for helium and argon pressuring for the ith helium-argon pressuring each. $t_{3,0n}$ is an interval time from the ending of helium-argon prefilling and sealing to the ending of the nth helium and argon pressuring.

When the time for nth helium and argon pressuring of helium-argon pressuring method meets formula (7), the maximum test-waiting time $t_{3n.max}$ of fine-leak test after nth helium-argon pressuring is approximately obtained by formula (8)

When $\tau_{Hemin} > \tau_{He0}$ $$t_{3n.max} = \frac{\tau_{Hemin} \tau_{He0}}{\tau_{Hemin} - \tau_{He0}} \ln\left(\frac{\tau_{Hemin}}{\tau_{He0}}\right) \quad (8)$$

$$t_{3n.max} \leq \frac{1}{10} \tau_{Hemin}$$

After the nth helium-argon pressuring, the criterion for acceptable helium measured leak rate of fine-leak test $R_{2n.max}$ is obtained by formula (9):

$$R_{2n.max} = \frac{V}{\tau_{Hemin}} \exp\left(-\frac{t_{3n}}{\tau_{Hemin}}\right) \quad (9)$$

$$\left\{ k P_0 \exp\left(-\frac{t_{3.0n}}{\tau_{Hemin}}\right) + \sum_{i=1}^{n} P_{E,i} \left[1 - \exp\left(-\frac{t_{1,i}}{\tau_{Hemin}}\right)\right] \exp\left(-\frac{t_{3,in}}{\tau_{Hemin}}\right) \right\}$$

Where, $t_{3n}$ is a test-waiting time after the nth helium-argon pressuring and $t_{3n}$ should not be longer than $t_{3n.max}$ specified in formula (8). $t_{3,in}$ is an interval time from the ending of the ith helium-argon pressuring to the ending of the nth helium-argon pressuring.

For the flexible schemes of helium-argon prefilling method and helium-argon pressuring method, an equivalent standard leak rate corresponding to the criterion for measured leak rate of fine-leak test is obtained by formula (10)

$$L_{max} = \frac{V P_0}{\tau_{Hemin}} \sqrt{\frac{M_{He}}{M_A}} \quad (10)$$

Step S3 of Helium-Argon Prefilling or Helium-Argon Pressuring:

The component under test which has not been sealed is placed into the helium-argon prefilling device and then the device is vacuumed to below 10 Pa. Argon gas is bombed to reach the Pressure $(1.05\sim1.10)k_{Ar}P_0$, helium gas is filled into to make the pressure reach $(1.05\sim1.10)(k_{Ar}+k) P_0$, afterwards nitrogen gas is filled to make the pressure reach $(1.05\sim1.10)P_0$, and then sealing the components. $k_{Ar}=0.934\%$; for the fixed scheme of the helium-argon prefilling method, $k=21.0\%$; for the flexible scheme, preferably taking $k=21.0\%$, or it can take the value in the range $3\%\sim50\%$. $k_{Ar}$ and k are not deviated by more than $\pm5\%$. The prefilled gas for the fixed scheme of the helium-argon prefilling method can also employ helium gas accounting for 21% of the total amount added to nitrogen gas produced with pressure swing adsorption method. Nitrogen gas produced with pressure swing adsorption method by removing oxygen, carbon dioxide, hydrogen, vapor and organic gas in air and reserves nitrogen and argon gas in air.

For the nth helium-argon pressuring of the helium-argon pressuring method, the component under test is placed in a helium-argon pressuring tank which is vacuumed to below 10 Pa. Within 2 min, argon gas of $k_{Ar}P_0=946$ Pa is filled into primarily and then helium gas is filled into according to the partial pressure $P_{E,n}$ of pressured helium gas permitted by S2. The total pressure of argon and helium gas is maintained within time of $t_{1,n}$ specified in formula (7) of S2. $P_{E,n}$ and $t_{1,n}$ are not deviated by more than 5%.

The value of k and value of $k_{Ar}$ for helium-argon prefilling and the time for sealing should be recorded and reserved; the partial pressure of helium gas $P_{E,i}$, time for helium-argon pressuring $t_{1,i}$ and time of the ending of helium-argon pressuring for each helium-argon pressuring is recorded and reserved.

Step S4 of Removing Absorbed Helium-Argon and Maintaining Internal $P_{Ar0}$:

Before combination test, the absorbed helium gas formed on the surface of the component under test during helium-argon prefilling and helium-argon pressuring should be removed. The removal of the absorption should be carried out in an environment having normal partial pressure of argon gas in air and can employ subsequent storage. The removal may be accelerated by blow of dry air and may be more effective by heated baking. After helium-argon prefilling or helium-argon pressuring of a component under test, if placed in a humid environment, a greater number of surficial absorbed helium should be removed by the method of heated baking.

No direct or potential damage should be made on the component under test during the removing process; and the time used for the removing process should not exceed the maximum test-waiting time of fine-leak test $t_{max}$ and generally no longer than (½) $t_{2max}$ to guarantee that the combination test of the component under test is completed within the maximum test-waiting time.

After removing the absorbed helium and argon, the surficial absorbed helium of the component under test and the measured leak rate formed by absorbed helium should be verified. The absorbed argon leak rate $R_{Ara}$ of gross-leak test should be no more than ⅓ of the criterion for argon measured leak rate $R_{Ar0max}$. The leak rate of absorbed helium $R_a$ of fine-leak test should be no more than ⅕ of the criterion for helium measured leak rate $R_{2max}$ or $R_{2n.max}$. Such verification may be carried out with 3 comparison samples with the same shape and appearance, which have been verified to be sealed components without any leak; the absorption leak rate may be obtained by subtracting the stable background value of the leak detector from the actual tested leak rate.

For the combination test, after helium-argon prefilling and sealing or helium-argon pressuring of a component under test, its internal partial pressure of argon gas $P_{Ar0}$ should be maintained and it is not allowed to absorb helium gas in vacuum or in gas lacking the normal partial pressure of argon gas in air. If placed in vacuum (including vacuum test) or in gas lacking the normal partial pressure of argon gas in the air for a time of $t_4$, the component under test must be placed in the normal air for a period no less than $3t_4$ or $3T_{Ar0}$ (take the smaller value between them) before conventionally carried out argon gross-leak test in combination test; or it must be placed in air for a period no less than $2.2t_4$ or $2.2T_{Ar0}$. The criterion for argon measured leak rate for gross leak takes the value of 90% of $R_{Ar0max}$ selected by S1 and tablet 1.

Step S5 of Calibrating:

The calibrations for the combination test of the present invention should be carried out respectively for the argon gas leak rate of gross-leak test and for the helium gas leak rate of fine-leak test and able to effectively cover the ranges of criterions for gross-leak test and fine-leak test. During calibration, the standard leak aperture should be placed in a test chamber or connect to a test chamber, or linked with a test chamber with the shortest distance. The calibration should be carried out at each time when the system is stable after starting the detector or after changing the device state (such as changing a test chamber and regenerating the cryogenic pump).

Step S6 of Comparing the Maximum Test-Waiting Time of Fine-Leak Test:

The test-waiting time $t_3$ or $t_{3n}$, which is from helium-argon prefilling and sealing of the test or the ending of helium-argon pressuring to the ending of fine-leak test of the combination test, is compared to the maximum test-waiting time $t_{3max}$ or $t_{3n.max}$ of fine-leak test specified by formula (3.1) (3.2) in S2, table 1 and formula (8). When the test-waiting time does not exceed the maximum test-waiting time, the test procedure enters Step S7. When the test-waiting time is longer than the maximum test-waiting time, helium-argon pressuring test is carried out again starting from S3.

Step S7 of Gross-Leak Test:

Before carrying out gross-leak test using argon gas as tracer gas in the combination test on a component under test, the time for starting taking value $t_{Ar0min}$ and the maximum test time $t_{Ar0max}$ of gross-leak test should be specified.

For the cumulative helium mass spectrometric leak detector which is employed, according to the selection of $R_{Ar0max}$ by S1, $t_{Ar0min}$ the maximum time from flushing the detecting chamber with nitrogen gas and beginning gross-leak test as vacuuming the detecting chamber to argon background leak rate $R_{Arb}$ falling to the value which is no more than (⅓) $R_{Ar0max}$ when the system is stable and no component under test is placed in the detecting chamber.

The maximum test time for gross leak $t_{Ar0max}$ to guarantee no false test for gross leak of a component under gross-leak test with an equivalent standard leak rate L (L>$L_0$) is approximately obtained by formula (13):

$$t_{Ar0max} \leq \tau_{Ar0} \frac{L_0}{L} \ln\left(\frac{L}{L_0}\right) \quad (13)$$

The maximum test time $t_{Ar0max}$ of gross-leak test should be far shorter than $T_{Ar0}$ of a component under test. The smaller $t_{Ar0max}/T_{Ar0}$ is, the wider the range of leak rate for gross leak which can guarantee no false test is. Generally $t_{Ar0max}$ takes the value no longer than (1/100) $T_{Ar0}$, and it can be (1.5~2)$t_{Ar0min}$.

The argon measured leak rate of gross-leak test $R_{Ar0}$ should be read between $t_{Ar0min}$ and $t_{Ar0max}$. During gross-leak test, argon measured leak rate can be detected either by cumulating the leakage of argon gas or not, but the test gas pipes should not be connected to the cryogenic pump. If $R_{Ar0} \geq R_{Ar0max}$, the sealability of the component under test is judged as failed; if $R_{Ar} < R_{Ar0max}$, Step S7 of gross-leak test is judged as acceptable, and the component under test is still placed in the vacuumed detecting chamber and is proceeded with Step S8 of fine-leak test. $R_{Ar0max}$ is based on the selection of S1 and table 1 and carries out the specification with respect to 90% in S4.

Even though within the maximum test-waiting time of fine-leak test, if the component under test has not been placed in air for the time no less than $3t_4$ or $3T_{Ar0}$ between the combination tests, there exists a bigger possibility of false test of gross-leak test in the latter combination test.

Step S8 of Fine-Leak Test:

According to the property of the cumulative helium mass spectrometric combination leak detector which is employed, when the criterion for measured leak rate for fine leak is less than a certain value (such as $5 \times 10^{-4}$ Pa·cm³/s or $1 \times 10^{-5}$ Pa·cm³/s), the test gas passes through the cryogenic pump and has a cumulative test; when the criterion for measured leak rate for fine leak is more than a certain value, test gas can either pass though the cryogenic pump or not and can either have a cumulative test or not.

Firstly the time $t_5$ for making helium leak rate background $R_b$ less than (⅕) $R_{max}$ with the leak detector starting a cumulative or a noncumulative test when no component under test is placed in the detecting chamber to carry out fine-leak test is specified. When the helium fine-leak test of a component under test is carried out, the fine-leak test is started and the measured leak rate is read from the time $t_5$.

If the measured leak rate R ($R_2$ or $R_{2n}$) is greater than the criterion for helium measured leak rate for fine leak $R_{max}$ ($R_{2max}$ or $R_{2n.max}$), the component under test is judged as failed for fine-leak test; If $R \leq R_{max}$, the fine-leak test is judged as acceptable, and S9 is proceeded. $R_{2max}$ is obtained via formula (4) in S2, table 1 or formula (6). $R_{2n.max}$ is obtained by formula (9) in S2.

When the gross-leak components under test can be effectively selected, within the maximum test-waiting time of fine-leak test, the sequential or multiple fine-leak tests of a component under test are efficient.

Step S9 of Complementally Testing the Bigger Gross Leak:

When necessary, an effective method for bigger gross leak test such as weight increased method, appearance detecting method and the like is added to detect the bigger gross leak which may be undetected in Step S7. If bigger gross leak is found to exist in complemented test, the sealability of the component under test is judged as failed; if S7 of gross-leak test and S8 of fine-leak test are both passed and no bigger gross leak is found in S9 of testing, the sealability of the component under test is finally judged as acceptable.

If no effective method is taken for complemented test of bigger gross leak, the sealability of the component under test can also be finally judged as acceptable via S7 and S8, but there exists a certain risk of false test for gross leak at this time.

Step S10 of Quantitative Test

If quantitative test on $T_{He}$ or L of a component under test is needed, in Step S6 and S8, for the fixed scheme and flexible scheme of the helium-argon prefilling method and for the flexible scheme of the helium-argon pressuring method, the maximum test-waiting time of fine-leak test $t_{3ma}$ and $t_{3n.max}$ both take the value more than (1/10)$T_{Hemin}$; for helium-argon pressuring method, a precondition $t_{3.0n} \leq (1/10) T_{Hemin}$ and $t_{1.i} \leq (1/5) T_{Hemin}$ is required.

In Step S8 of fine-leak test, the helium leak rate background $R_b$ when the detecting chamber is load-free is read, and the measured leak rate R ($R_2$ or $R_{2n}$) of fine-leak test of a component under test is read.

For the component under test with acceptable sealability $T_{Hemin}$, the actual helium measured leak rate R' ($R_2'$ or $R_{2n}'$) of a component under test is obtained by formula (14)

$$R' = R - R_b \quad (14)$$

Herein R' comprises the leak rate of absorbed helium of a component under test $R_a$ and each test deviation.

$T_{He}$ of a component under test is obtained by formula (15) and L of a component under test is obtained by formula (16).

$$\tau_{He} = \tau_{Hemin} \frac{R_{max}}{R'} \quad (15)$$

$$L = L_{max} \frac{R'}{R_{max}} \quad (16)$$

$T_{He}$ and L obtained via formula (15) and (16) both can be regarded as quantitative test results of sealability which has certain test deviation.

For helium-argon pressuring method, if the condition of $t_{3.0n} \leq (1/10) T_{Hemin}$ and $t_{1.i} \leq (1/5) T_{Hemin}$ is unsatisfied, $T_{He}$ which is no less than $T_{Hemin}$ can be obtained by fitting formula (17).

$$R_{2n} = \frac{V}{\tau_{He}} \exp\left(-\frac{t_{3n}}{\tau_{He}}\right) \quad (17)$$

$$\left\{ kP_0 \exp\left(-\frac{t_{3.0n}}{\tau_{He}}\right) + \sum_{i=1}^{n} P_{E,i} \left[1 - \exp\left(-\frac{t_{1.i}}{\tau_{He}}\right)\right] \exp\left(-\frac{t_{3.in}}{\tau_{He}}\right) \right\}$$

Corresponding L is obtained by formula (18):

$$L = \frac{VP_0}{\tau_{He}} \sqrt{\frac{M_{He}}{M_A}} \quad (18)$$

The invention is advantageous by providing the applying procedure and further effectively lengthening the maximum test-waiting time of fine-leak lest via putting forward the method of cumulative helium mass spectrometric combination test by using argon as tracer gas of gross-leak test and using helium gas as tracer gas of fine-leak test, which may guarantee the removal of absorbed helium of a component under test meeting the test requirements of a high rigour grade and a low criterion for fineleak measured leak rate, thus tremendously expanding the range of the cavity volume and criterion for helium gas measured leak rate of fine-leak test adapted for combination test.

As known by those skilled in the art, the present invention which has been described with reference to the embodiments can make various changes and equivalent replacements on these characteristics and embodiments without departing from the spirit and scope of the present invention. Additionally, under the guidance of the present invention, these characteristics and embodiments can be modified to be adapted for specific conditions without departing from the spirit and scope of the present invention. Accordingly, the present invention is not limited to the specific embodiments disclosed herein and all embodiments which fall within the claims of the present invention belong to the scope protected by the present invention.

The invention claimed is:

1. A method of cumulative helium mass spectrometric combination test by using argon gas as gross-leak tracer gas, including gross-leak test and fine-leak test, wherein
   a helium-argon prefilling method is selected for a primary sealability test, wherein a component under test is prefilled with a gas mixture of nitrogen, helium and argon and then sealed, wherein a ratio of a partial pressure of the argon gas to a total pressure is 0.934%; and
   a helium-argon pressuring method is selected for a secondary sealability test, wherein a component under test is pressured with a gas mixture of helium and argon, wherein the partial pressure of the argon gas is a partial pressure of argon gas in the air $P_{Ar0}$; wherein helium gas is used as fine-leak tracer gas;
   for the helium-argon prefilling method employed for the primary sealability test, when the rigour grade $T_{Hemin}$ (2000d, 200d and 20d), cavity volume, the required removal of absorbed helium and absorbed argon and the accuracy of test specified in the fixed scheme are applicable, the fixed scheme is selected;
   for the fixed scheme of helium-argon prefilling method, on a precondition that the criterion for argon measured leak rate $R_{Ar0max}$ of gross-leak test is larger than the leak rate of surficially absorbed argon of the component under test in dry air by 3 times, corresponding to different cavity volumes, the minimum detectable equivalent standard leak rate of gross-leak test $L_0$ is respectively selected as 0.1 Pacm$^3$/s, 0.3 Pacm$^3$/s and 1.0 Pacm$^3$/s, and $R_{Ar0max}$ as $7.95 \times 10^{-4}$ Pacm$^3$/s, $2.39 \times 10^{-3}$ Pacm$^3$/s and $7.95 \times 10^{-3}$ Pacm$^3$/s; when regulations of the fixed scheme are not completely applicable, the flexible scheme is selected, wherein the criterion $R_{Ar0max}$ for argon measured leak rate of gross-leak test is selected according to the cavity volume of the component under test, the leak rate of surficially absorbed argon of the component under test when being stored in dry air and argon leak rate background of the leak detector having test chamber;
   for the helium-argon pressuring method, $R_{Ar0max}$ is flexibly selected depending on the leak rate of absorbed argon of the component under test in dry air.

2. A method of cumulative helium mass spectrometric combination test by using argon gas as gross-leak tracer gas according to claim 1, characterized in that aiming at the selected specific method, solution and $R_{Ar0max}$, time for helium-argon pressuring $t_{1.n}$, maximum test-waiting time of fine-leak test $t_{max}$ and criterion for helium measured leak rate $R_{max}$, are designed and specified, wherein the procedure and method of designing are as follows:
   for helium-argon prefilling method, $t_{max}$, is $t_{3max}$, $R_{max}$, is $R_{2max}$; for helium-argon pressuring method, after n (n≥1) times of helium-argon pressuring, $t_{max}$ is $t_{3n.max}$, $R_{max}$ is $R_{2n.max}$;
   take the gross-leak argon gas exchange time constant:

$$\tau_{He0} = \frac{VP_{Ar0}}{R_{Ar0max}} \sqrt{\frac{M_{He}}{M_{Ar}}}$$

wherein V denotes a cavity volume of a component under test, $P_{Ar0}$ denotes the partial pressure of argon gas in normal air, $P_{Ar0}=946Pa$, $M_{He}$ and $M_{Ar}$ respectively denote the molecular weight of helium gas and argon gas in grams, $M_{He}=4.003g$, $M_{Ar}=39.948g$;

take the gross-leak helium gas exchange time constant:

$$\tau_{Ar0} = \frac{VP_{Ar0}}{R_{Ar0max}}$$

for helium-argon prefilling method, the maximum test-waiting time of fine-leak test $t_{3max}$ is obtained by the following formula:

If $\tau_{Hemin} < \tau_{He0}$ $$t_{3max} = \frac{\tau_{Hemin}\tau_{He0}}{\tau_{Hemin} - \tau_{He0}} \ln\left(\frac{\tau_{Hemin}}{\tau_{He0}}\right)$$

wherein the rigour grade $\tau_{Hemin}$ is the minimum helium gas exchange time constant of the component with acceptable sealability;

for the fixed scheme of the helium-argon prefilling method, $\tau_{Hemin}$ takes 2000d, 200d and 20d, and $t_{3max}$ conforms to the following formula;

$$t_{3max} \leq \frac{1}{10}\tau_{Hemin}$$

for the flexible scheme of the helium-argon prefilling method, $\tau_{Hemin}$ can flexibly take a value greater than $\tau_{He0}$;

for the fixed scheme of the helium-argon prefilling method, in a condition of test-waiting time $t_3 \leq t_{3max}$, the criterion for acceptable helium measured leak rate of fine-leak test $R_{2max}$ is obtained by the following formula $$R_{2max} = \frac{V_1 k P_0}{\tau_{Hemin}}$$

where, $V_1$ denotes the minimum volume in a cavity volume segment; k denotes a ration of prefilled helium, $P_0$ denotes a standard atmospheric pressure, $P_0=1.013 \times 10^5 Pa$; for the fixed scheme of helium-argon prefilling method, take k=21.0%;

the equivalent standard leak rate of a cavity volume segment of the fixed scheme of the helium-argon prefilling method is obtained according to $R_{2max}$ via the following formula:

$$L_{2max} = \frac{1}{k} R_{2max} \sqrt{\frac{M_{He}}{M_A}}$$

where, $M_A$ denotes the mean molecular weight of air in grams, $M_A=28.96g$;

for the flexible scheme of helium-argon prefilling method, $R_{2max}$ is obtained via the following formula:

$$R_{2max} = \frac{VkP_0}{\tau_{Hemin}} \exp\left(-\frac{t_3}{\tau_{Hemin}}\right)$$

where, k denotes a ratio of prefilled helium of flexible scheme, and takes k=21.0% or takes a value in the range of 3%~50%, $t_3$ denotes an actual test-waiting time but should be no longer than $t_{3max}$ specified in the following formula;

$$t_{3max} = \frac{\tau_{Hemin}\tau_{He0}}{\tau_{Hemin} - \tau_{He0}} \ln\left(\frac{\tau_{Hemin}}{\tau_{He0}}\right)$$

for helium-argon pressuring method, for n (n≥1) times of the helium and argon pressuring, the partial pressure of helium is $P_{E.n}$ time for the nth helium-argon pressuring is obtained via the following formula:

$$t_{1.n} \geq \frac{1}{e} \frac{1}{P_{E.n}} \left(\frac{1}{10} kP_0 t_{3.0n} + \frac{1}{e}\sum_{i=1}^{n-1} P_{E.i} t_{1.i}\right)$$

$$t_{1.n} \geq 1.2h$$

where, $P_{E.i}$ and $t_{1.i}$ respectively denote the partial pressure of helium gas and time for helium and argon pressuring for the ith helium-argon pressuring each. $t_{3.0n}$ is an interval time from the ending of helium-argon prefilling and sealing to the ending of the nth helium and argon pressuring;

when the time for nth helium and argon pressuring of helium-argon pressuring method meets the above formula, the maximum test-waiting time $t_{3n.max}$ of fine-leak test after nth helium-argon pressuring is approximately obtained via the following formula:

when $\tau_{Hemin} < \tau_{He0}$ $$t_{3n.max} = \frac{\tau_{Hemin}\tau_{He0}}{\tau_{Hemin} - \tau_{He0}} \ln\left(\frac{\tau_{Hemin}}{\tau_{He0}}\right)$$

$$t_{3n.max} \leq \frac{1}{10}\tau_{Hemin}$$

after the nth helium-argon pressuring, the criterion for acceptable helium measured leak rate of fine-leak test $R_{2n.max}$ is obtained by the following formula:

$$R_{2n.max} = \frac{V}{\tau_{Hemin}} \exp\left(-\frac{t_{3n}}{\tau_{Hemin}}\right)$$

$$\left\{kP_0 \exp\left(-\frac{t_{3.0n}}{\tau_{Hemin}}\right) + \sum_{i=1}^{n} P_{E.i}\left[1 - \exp\left(-\frac{t_{1.i}}{\tau_{Hemin}}\right)\right] \exp\left(-\frac{t_{3.in}}{\tau_{Hemin}}\right)\right\}$$

where, $t_{3n}$ is a test-waiting time after the nth helium-argon pressuring and $t_{3n}$ should not be longer than $t_{3n.max}$ specified in the following formula:

$$t_{3n.max} = \frac{\tau_{Hemin}\tau_{He0}}{\tau_{Hemin} - \tau_{He0}} \ln\left(\frac{\tau_{Hemin}}{\tau_{He0}}\right)$$

$$t_{3n.max} \leq \frac{1}{10}\tau_{Hemin}$$

where, $t_{3.in}$ is an interval time from the ending of the ith helium-argon pressuring to the ending of the nth helium-argon pressuring;

for the flexible schemes of helium-argon prefilling method and helium-argon pressuring method, an equivalent standard leak rate corresponding to the criterion for measured leak rate of fine-leak test is obtained by the following formula:

$$L_{max} = \frac{VP_0}{\tau_{Hemin}} \sqrt{\frac{M_{He}}{M_A}}.$$

3. A method of cumulative helium mass spectrometric combination test by using argon gas as gross-leak tracer gas according to claim 1, including helium-argon prefilling or helium-argon pressuring, wherein:

for helium-argon prefilling method, the total pressure of the prefilled gas should be $1.05\sim1.10P_0$, wherein the ratio of the partial pressure of argon gas to the total pressure is 0.934% the ratio of partial pressure of helium gas to the total pressure, namely the ratio of prefilled helium, is 21.0% for a fixed scheme, and this ratio for a flexible scheme is 21.0% or varies in 3%~50%, and the rest is the nitrogen gas;

for the helium-argon pressuring method, in the nth helium-argon pressuring, the partial pressure of argon gas in the pressured gas is 946 Pa, the partial pressure of helium gas is $P_{E,n}$ and the time $t_{1,n}$ for helium-argon pressuring should conform to the following formula:

$$\left. \begin{array}{l} t_{1,n} \geq \dfrac{1}{e} \dfrac{1}{P_{E,n}} \left( \dfrac{1}{10} kP_0 t_{3,0n} + \dfrac{1}{e} \sum_{i=1}^{n-1} P_{E,i} t_{1,i} \right) \\ t_{1,n} \geq 1.2\,h \end{array} \right\}.$$

4. A method of cumulative helium mass spectrometric combination test by using argon gas as gross-leak tracer gas according to claim 1, including removing absorbed helium-argon and maintaining internal $P_{Ar0}$, wherein the removal of the absorption should be carried out in an environment having normal partial pressure of argon gas in air;

time for removing should not exceed the maximum test-waiting time of fine-leak test $t_{max}$ and generally no longer than ½ of $t_{2max}$;

after removing the absorption, the leak rate $R_a$ of absorbed helium of a leakless sample from the components under test should be no more than ⅕ of the criterion for helium measured leak rate $R_{max}$ of fine-leak test, the leak rate $R_{Ara}$ of absorbed argon of a leakless sample should be no more than ⅓ of the criterion for argon measured leak rate $R_{Ar0max}$ of gross-leak test.

5. A method of cumulative helium mass spectrometric combination test by using argon gas as gross-leak tracer gas according to claim 4, wherein after helium-argon prefilling and sealing or helium-argon pressuring of a component under test, its internal partial pressure of argon gas $P_{Ar0}$ should be maintained;

if placed in vacuum (including vacuum test) or in gas lacking the normal partial pressure of argon gas in the air for a time of $t_4$, the component under test must be placed in the normal air for a period no less than $3t_4$ or $3\tau_{Ar0}$ (take the smaller value between them) before conventionally carried out argon gross-leak test in combination test; or it must be placed in air for a period no less than $2.2t_4$ or $2.2\tau_{Ar0}$;

the criterion for argon measured leak rate for gross leak takes the value of 90% of $R_{Ar0max}$.

6. A method of cumulative helium mass spectrometric combination test by using argon gas as gross-leak tracer gas according to claim 1, wherein before the gross-leak test using argon gas as tracer gas in the combination test of a component under test, the time for starting taking value of gross-leak test $t_{Ar0min}$ and the maximum test time $t_{Ar0max}$ should be specified;

according to the selection of $R_{Ar0max}$, corresponding cumulative helium mass spectrometric leak detector and test chamber are selected, wherein $t_{Ar0min}$ is the maximum time since beginning gross-leak test as vacuuming the test chamber to argon background leak rate falling to the value which is no more than (⅓) $R_{Ar0max}$ when the system is stable and no component under test is placed in the test chamber;

the maximum test time $t_{Ar0max}$ of gross-leak test should be far shorter than $\tau_{Ar0}$ of a component under test;

generally $t_{Ar0max}$ takes the value no longer than (1/100) $\tau_{Ar0}$, and it can be (1.5~2) $t_{Ar0min}$;

the argon measured leak rate of gross-leak test $R_{Ar0}$ is read between $t_{Ar0min}$ and $t_{Ar0max}$;

in gross-leak test, argon measured leak rate can be detected either by cumulating the leakage of argon gas or not, but the test gas pipes should not be connected to the cryogenic pump;

if $R_{Ar0} \geq R_{Ar0max}$, the gross-leak test of the component under test is judged as failed; if $R_{Ar} < R_{Ar0max}$, the gross-leak test is judged as acceptable, and of fine-leak test is proceeded.

* * * * *

UNITED STATES PATENT AND TRADEMARK OFFICE
CERTIFICATE OF CORRECTION

PATENT NO. : 9,651,444 B2
APPLICATION NO. : 14/134006
DATED : May 16, 2017
INVENTOR(S) : Genglin Wang et al.

It is certified that error appears in the above-identified patent and that said Letters Patent is hereby corrected as shown below:

In the Claims

In Claim 2, at Column 21, Line 15, the expression "$\tau Hemin < \tau He0$" should be corrected to "$\tau Hemin > \tau He0$".

In Claim 2, at Column 22, Line 35, the expression "$\tau Hemin < \tau He0$" should be corrected to "$\tau Hemin > \tau He0$".

Signed and Sealed this
Thirty-first Day of October, 2017

Joseph Matal
*Performing the Functions and Duties of the
Under Secretary of Commerce for Intellectual Property and
Director of the United States Patent and Trademark Office*